UNITED STATES PATENT OFFICE.

EUGÈNE MENTHA, OF LUDWIGSHAFEN-ON-THE-RHINE, GERMANY, ASSIGNOR TO THE BADISCHE ANILIN AND SODA FABRIK, OF SAME PLACE.

DIHYDROXYNAPHTHALENE.

SPECIFICATION forming part of Letters Patent No. 449,551, dated March 31, 1891.

Application filed December 12, 1890. Serial No. 374,492. (Specimens.)

*To all whom it may concern:*

Be it known that I, EUGÈNE MENTHA, doctor of philosophy, a citizen of Switzerland, residing at Ludwigshafen-on-the-Rhine, in the Kingdom of Bavaria and Empire of Germany, have invented new and useful Improvements in the Production of a New Dihydroxynaphthalene, of which the following is a specification.

My invention relates to the production of a new compound suitable for use in the manufacture of dye-stuffs. The said compound is a dihydroxy derivative of naphthalene, and from the probable relative positions of the hydroxyl groups I call it "2.3 dihydroxynaphthalene."

I describe two processes by means of which my new compound can be prepared.

The first process is based upon the discovery that dihydroxynaphthalene monosulpho-acid R on melting with twice its weight of a caustic alkali at a temperature of about three hundred to three hundred and twenty degrees centigrade (300° to 320° C.) yields my new compound, and not, as might be expected, a trihydroxy derivative.

In my second process the dihydroxynaphthalene monosulpho-acid R is converted into my new compound by treatment with a dilute mineral acid.

I give first, for the sake of convenience, an example of the manner in which the dihydroxynaphthalene monosulpho-acid R can be prepared for use in my invention. The parts are by weight. About sixty parts of caustic soda and thirty parts of R salt are melted together, mixing them with about eight parts of water. The temperature of the melt is raised to about 240° centigrade and maintained between this temperature and 280° for about three hours, or until the production of monosulpho-acid has reached its maximum. This can be ascertained by withdrawing equal test portions from the melt at intervals of, say, about ten minutes, dissolving them in sufficient hydrochloric acid containing about ten per cent. of real hydrochloric acid (HCl) to give an acid solution, boiling and filtering, and then precipitating the dihydroxynaphthalene monosulpho-acid formed with common salt. As soon as successive tests show no increase in the quantity formed the operation is interrupted. The whole melt is then dissolved and acidified with hydrochloric acid containing about ten per cent. of real hydrochloric acid (HCl) brought to the boil, filtered, and the solution saturated with common salt. The sodium salt of the desired sulpho-acid which separates out on cooling can be collected on the filter, pressed, and dried. It can be purified by dissolving again in hot water and reprecipitating with sodium chloride.

The following examples illustrate fully the manner in which my new compound may be obtained.

*Example 1.*—Production of the new compound by melting the dihydroxynaphthalene monosulpho-acid R with caustic soda: Take about twenty (20) parts of caustic soda and two and a half (2½) parts of water and heat the mixture to a temperature of about two hundred and fifty degrees (250°) centigrade. Then add about ten (10) parts of the sodium salt of the dihydroxynaphthalene monosulpho-acid, obtained as hereinbefore described, or in any other way. Raise the temperature to about three hundred to three hundred and twenty degrees (300° to 320°) centigrade and maintain at this temperature for about one hour, or until no increase in the quantity of product soluble in ether occurs in successive test portions after acidification with hydrochloric acid. This point being arrived at, acidify the melt by mixing it with about thirty (30) parts of ordinary concentrated sulphuric acid containing about ninety-six per cent. (96%) of real sulphuric acid ($H_2SO_4$) diluted with about two hundred (200) parts of water. Bring to the boil and filter hot. Allow the filtrate to cool, and then extract either with ether or with fusel-oil. Distill off the solvent and extract the residual oil with boiling water, filter hot, and allow the filtrate to cool. The dihydroxynaphthalene separates out and is purified by repeated recrystallization from water. If the temperature of the melt in the above example be maintained between two hundred and eighty and three hundred degrees (280° and 300°) centigrade, the production of the dihydroxynaphthalene takes place more slowly. Above three hundred and thirty degrees (330°) centigrade decomposition takes place.

From the explanation above given it will be seen that the dihydroxynaphthalene monosulpho-acid R results from melting the sodium salt of betanaphthol disulpho-acid (R salt) with about twice its weight of a caustic alkali at a temperature of about 240° to 280°. It is therefore possible to obtain my new compound, if desired, directly from the sodium salt of betanaphthol disulpho-acid by melting this body with, say, about four times its weight of alkali at a temperature of about three hundred to three hundred and twenty degrees (300° to 320°) centigrade, without separating the dihydroxynaphthalene monosulpho-acid R, which is produced in this case as an intermediate product.

*Example 2.*—Preparation of the new dihydroxynaphthalene from the hereinbefore-mentioned dihydroxynaphthalene monosulpho-acid by treatment with dilute mineral acids: Mix about ten (10) parts of the sodium salt of the dihydroxynaphthalene monosulpho-acid obtained as hereinbefore described, or in any other way, with about one hundred (100) parts of dilute sulphuric acid containing about twenty-five per cent. of real sulphuric acid (25% $H_2SO_4$) and heat the mixture in a closed vessel capable of standing pressure to a temperature of about two hundred degrees centigrade (200° C.) for about twelve hours, or until the following test indicates the end of the reaction: Take a sample of the mixture and extract thoroughly with ether, add a slight excess of an alkali to the aqueous solution, and then in the cold a solution of diazo-benzene-chloride. If but little azo dye-stuff of the dihydroxynaphthalene monosulpho-acid be formed, the operation may be considered at an end. This point being arrived at, cool the product and filter it and recrystallize the impure dihydroxynaphthalene which remains on the filter from water. If weaker acid be used than sulphuric acid containing twenty-five per cent. of real sulphuric acid, (25% $H_2SO_4$,) the operation takes longer, and a higher temperature is necessary, and with stronger acid it is possible to prepare the dihydroxynaphthalene at a lower temperature and more quickly.

My new 2.3 dihydroxynaphthalene, obtained by either of the above methods, is readily soluble in hot water and but slightly soluble in cold water, and can be obtained practically pure by repeated recrystallization from hot water. It is readily soluble in alcohol, ether, and fusel-oil, slightly soluble in benzine and petroleum ether.

My new 2.3 dihydroxynaphthalene differs from all known dihydroxynaphthalenes in melting at a temperature of about 160° to 161° centigrade and in its reaction with ferric chloride. If a dilute cold solution be treated with a dilute cold solution of ferric chloride, an intensely blue coloration is obtained, which in the cold retains its color for several hours.

My new compound can be used in the manufacture of dye-stuffs, and confers on coloring-matters, of which it forms a component, the valuable property of being fixed by metallic mordants.

What I claim as new, and desire to secure by Letters Patent, is—

The new dihydroxynaphthalene, which melts at a temperature of 160° to 161° centigrade, and which is slightly soluble in cold water, readily soluble in hot water, alcohol, ether, and fusel-oil, slightly soluble in benzine and petroleum ether, and which yields an intensely blue coloration with ferric chloride solution, all substantially as hereinbefore described.

In testimony whereof I have hereunto set my hand in the presence of two subscribing witnesses.

EUGÈNE MENTHA.

Witnesses:
ERNEST F. EHRHARDT,
CARL KLOTZ.